United States Patent [19]

Alderton et al.

[11] Patent Number: 4,472,917
[45] Date of Patent: Sep. 25, 1984

[54] FIXING DEVICE FOR MOUNTING A PLATE ON THE FLANGE OF A BEAM

[75] Inventors: Gordon H. S. Alderton, Bingley; Graham L. Martin, Bradford; Neil F. Gill, Shipley, all of England

[73] Assignee: Henry Lindsay Limited, West Yorkshire, England

[21] Appl. No.: 421,394

[22] Filed: Sep. 22, 1982

[30] Foreign Application Priority Data

Sep. 24, 1981 [GB] United Kingdom ............... 8128916
Jul. 5, 1982 [GB] United Kingdom ............... 8219414

[51] Int. Cl.$^3$ ............................................. F04B 5/52
[52] U.S. Cl. ....................................... 52/489; 52/483; 52/768; 24/525; 269/229
[58] Field of Search ............... 52/489, 768, 483, 766, 52/764; 411/535, 537; 24/525, 335; 269/43, 47, 229, 231

[56] References Cited

U.S. PATENT DOCUMENTS

| | | | |
|---|---|---|---|
| 2,253,916 | 8/1941 | Richardson | 52/483 |
| 3,008,553 | 11/1961 | Glitsch | 52/483 |
| 3,017,673 | 1/1962 | Biris | 52/483 |
| 3,122,048 | 2/1964 | Warner | 411/535 |
| 3,372,520 | 3/1968 | Hensel | 52/483 |
| 4,062,164 | 12/1977 | Cousins | 52/489 |

FOREIGN PATENT DOCUMENTS

322361 6/1957 Switzerland ............... 411/535

Primary Examiner—John E. Murtagh
Assistant Examiner—Kathryn Ford
Attorney, Agent, or Firm—Larson and Taylor

[57] ABSTRACT

There is disclosed a fixing device for mounting a plate on one side of a flange of a beam, the device comprising a base portion for engagement with an opposite side of the flange, and upstanding portion provided on the base portion, a hole extending through the base and upstanding portions and formed with a screwthread along at least part of its length, and a threaded fastener adapted to be taken through a hole in the plate and into threaded engagement with the hole in the device in order to hold-down the plate onto the flange. The base portion extends eccentrically with respect to the hole in the device, and the hole forms a pivot axis for the device when the threaded fastener is in engagement therewith, whereby the device is pivotable by the threaded fastener between a release position in which the base portion is out of engagement with the opposite side of the flange and a position of engagement with the opposite side of the flange so that, upon tightening of the fastener, the flange is gripped between the plate and the base portion of the fixing device and the plate is held-down onto said one side of the flange.

4 Claims, 14 Drawing Figures

FIXING DEVICE FOR MOUNTING A PLATE ON THE FLANGE OF A BEAM

This invention relates to a fixing device for mounting a plate on the flange of a beam.

The term "plate" as employed herein is intended to include any plate-like member, such as a flange, lip or the like, and the reference to the "flange of a beam" is intended to include any structural beam, such as an angle, channel or I-beam, having a projecting flange.

In the construction of buildings, and particularly warehouses, it is often the practice to mount a sub-floor on an existing floor by arranging I-beams on the existing floor, and then by mounting so-called Chequer or Durbar plates on the upper flanges of the I-beams. These plates are made of sheet steel, about 8 ft. by 4 ft, and for many years they have been mounted on flanges by one of three methods.

First of all, the plates can be secured in position by drilling holes through the plates and through the flanges, and then by taking fixing bolts through the aligned holes and attaching nuts to the ends of the bolts which project below the lower surfaces of the flanges. Evidently, this is a time-consuming task, and requires access to be had to the underside of the plates to enable the fastening operations to be completed. In addition, this can give rise to substantial problems when, for example, the final plate of a sub-floor is about to be mounted in position. Furthermore, quite frequently it is necessary to be able to gain access to the underside of the sub-floor, and this also can cause difficulties in the removal of a first plate of the sub-floor, since the nuts underneath the sub-floor cannot readily be reached.

Secondly, the plates can be secured in position by drilling holes in the plates, and then tapping holes in the flanges of the beams. To mount the plates in position, a bolt is then taken through each drilled hole in the plate and into an aligned tapped hole in the flange. Bearing in mind that a substantial number of pairs of aligned drilled and tapped holes are usually provided for each plate and flange, this requires very careful workmanship to provide satisfactory alignment of the holes in each pair. This second method is therefore a time-consuming and exacting method of mounting the plates in position.

Thirdly, the plates can be placed in position on the flanges, and then edge-welded down onto the flanges. This is also a time-consuming and expensive task, which provides a not very pleasing visual result, and which has the big disadvantage that the plates cannot readily be removed when access to the underside of the sub-floor is required.

Accordingly, there exists a need within the construction industry to provide a means whereby floor or other plates can be mounted removably on the flanges of beams in simpler manner than hitherto and without requiring access to be had to the underside of the plates in order to complete the mounting operations.

According to a first aspect of the invention there is provided a fixing device for mounting a plate on one side of a flange of a beam, said device comprising a base portion for engagement with an opposite side of the flange, an upstanding portion provided on said base portion, a hole extending through said portions and formed with a screw thread along at least part of its length, and a threaded fastener adapted to be taken through a hole in the plate and into threaded engagement with the hole in the device in order to hold down the plate onto the flange; in which the base portion extends eccentrically with respect to the hole in the device, and the hole forms a pivot axis for the device when the threaded fastener is in engagement therewith whereby the device is pivotable by the threaded fastener between a release position in which the base portion is out of engagement with said opposite side of the flange and a position of engagement with said opposite side of the flange so that, upon tightening of the fastener, the flange is gripped between the plate and the base portion of the fixing device and the plate is held down onto said one side of the flange.

Thus, the device may be used to mount plates e.g. floor plates onto spaced flanged beams in simple manner by carrying out the mounting operations solely from the "plate" side of the assembly. A plate may be mounted loosely on the flanges of a pair of spaced beams, and either the plate has pre-drilled holes along each edge, or is drilled in situ, such that the holes are located closely spaced from the longitudinal edges of the adjacent flanges. A fixing device is assembled below each hole in the plate by taking a threaded fastener through the hole and into the threaded hole in the device. The fixing devices should be arranged so that they do not engage the flanges as the plate is lowered into position i.e. the devices should be in their "release" positions. Conveniently, in the release position, the device has a rectilinear portion which will be located substantially parallel to the longitudinal edge of the adjacent flange. To facilitate assembly, the device may have some form of coding e.g. colour coding to indicate to the assembler where the rectilinear portion should be located when the device is attached to the plate.

When the plate has been loosely laid on the flanges of two (or more) spaced beams, with a fixing device attached to each hole and occupying the release position, the mounting of the plate can be carried out by manipulation, at the upper side of the plate, of the fixing devices to their engaged positions. Usually, the devices will be held fairly tightly to the plate in their released positions (by suitable tightening of the fasteners), so that they do not become displaced from their release position during offering of the plate to the flanges. A limited amount of lateral adjustment of the plate (relative to the longitudinal edges of the flanges) can be carried out by virtue of allowed clearances between the rectilinear portions of the devices and the flange edges. Once the required position of the plate has been obtained, each fixing device is loosened, by slackening the corresponding fastener, and is then rotated by the fastener i.e. is backed-off, until a part of the rectilinear portion abuts the edge of the flange. However, to provide sufficient slackness in the attachment of the device (for a purpose which will shortly be apparent), approximately 360° of motion of the fastener will usually be required in the loosening direction, of which about, say, the first 30° will be taken-up by movement of the rectilinear portion into abutment with the flange edge.

The backed-off position of the device still constitutes a "release position" of the device, but it is now in a state of readiness to be pivotted to the fully engaged position by reverse rotation of the fastener i.e. rotation in the normal tightening direction.

As the fastener rotates e.g. an Allen bolt in the tightening direction this is accompanied immediately by rotation therewith by the fixing device, even although the fixing device is presently only loosely attached to the plate via the bolt. Forward rotation of the bolt through up to 270° will usualy be sufficient to cause the eccentric base portion to move into sliding engagement with the underside of the flange.

The upstanding portion of the device may have a cam or guiding surface, which preferably is gently curved, and which is located generally diametrically opposite to the rectilinear portion with respect to the hole extending through the device. As the device is rotated to the engaged position of the base portion, the guiding surface (which has a progressively increasing radial spacing from the centre of the hole in the device with respect to the direction of forward rotation to the engaged position), approaches the flange edge and comes into contact therewith. Further rotation of the bolt continues until the guiding surface makes "hard contact" with the flange edge so as to locate the device (and the plate) in the required position. Thereafter, tightening of the bolt causes the plate and the base portion to be drawn together with the flange gripped ever more tightly therebetween.

The guiding surface serves three very useful purposes: 1. It provides scope for lateral adjustment of the plate during mounting; 2. It provides firm lateral restraint to the mounting of the plate and flange when the bolt is fully tightened; and 3. It provides a stop to indicate to the assembler (who cannot see what is happening below the plate) that the mounting operation is nearly complete, and causes automatic tightening of the device when the guiding surface comes into firm abutment with the flange edge.

By virtue of the increasing radial spacing of the guiding surface, the limit position can be reached for a range of different initial spacings between the hole in the plate and the edge of the flange. Accordingly, absolutely accurate control over the drilling of the holes in the plate is not necessary, since the guiding surface can accommodate different spacings.

Conveniently, the device is formed as a malleable iron casting, and the base portion may be partly hollowed-out, in its opposite surface to the upstanding portion, in order to conserve material.

The upstanding portion, which lies against the flange edge via its guiding surface when the base portion is in its engaged position, effectively forms a spacer between the base portion and the plate and defines a gap into which the flange can be received. Conveniently, the upstanding portion will have a slightly smaller extent, in a direction parallel to the bolt, than the thickness of the flange with which it is to be used, so that the flange can readily be accommodated in the device. Further, this will enable the fixing device to be used with flanges in a range of thicknesses. However, if desired, any relative difference between the thickness of the flange and the vertical extent of the upstanding portion may be taken-up by means of washers or other spacers.

The fixing device may have other uses in the construction industry to the mounting of floor plates on flanged beams.

The invention is also concerned with a method of mounting a plate, such as a floor plate, on a flanged beam in order to form a floor, using a fixing device as defined above.

According to a second aspect of the invention there is provided a fixing device for mounting a plate on one side of a flange of a beam, said device comprising a base portion for engagement with an opposite side of the flange, an upstanding portion provided on said base portion, a hole formed in said upstanding portion and having a screwthread along at least part of its length, and a threaded fastener adapted to be taken through a hole in the plate and into threaded engagement with the hole in the upstanding portion in order to hold-down the plate onto the flange, in which:

the hole forms a pivot axis for the device when the threaded fastener is in engagement therewith, whereby the device is pivotable by the threaded fastener between a release position in which the base portion is out of engagement with said opposite side of the flange and a position of engagement with said opposite side of the flange so that, upon tightening of the fastener, the flange is gripped between the plate and the base portion of the fixing device and the plate is thereby held-down onto the flange;

and the base portion comprises two or more steps arranged along at least part of the periphery of the base portion, each step having a flange-engaging surface portion for engaging said opposite side of the flange and an edge portion for engaging the edge of the flange, and the arrangement being such that, upon pivotting of the base portion by the fastener to the engaged position, the flange-engaging surface portion of one of the steps moves into sliding engagement with said opposite side of the flange and the edge portion of the adjacent step (in direction towards the plate) moves into engagement with the edge of the flange.

Preferably, a continuous series of steps is arranged along the periphery of the base portion, so as to render the fixing device self-adjusting to suit a range of flange thicknesses. Thus, depending upon the thickness of a particular flange, say 10mm thick, the step which is located at a position such that its flange-engaging surface is at approximately the same distance below the plate will move into sliding engagement with the side (usually the underside) of the flange and the edge portion of the next highest step will move into engagement with the flange edge.

By providing suitable "risers" between each step, a single fixing device of the invention can be used with progressively increasing flange thicknesses, in a range of flange thicknesses.

Conveniently, the steps are arranged partly around the upstanding portion in the manner of a spiral staircase.

If it should be desired to increase the range of flange thicknesses with which the fixing device can be used, a collar may be provided to fit between the upstanding portion and the adjacent side (usually the underside) of the plate. Thus, for a fixing device having steps arranged so that the fixing device can be used with flanges having thickness in the range, say, 6 mm to 18 mm (increasing in stages by 2 mm when 2 mm risers are provided between each step), the provision of a 10 mm thick collar will enable the fixing device to be used additionally with flanges of thickness in the range 16 mm to 28 mm.

The fixing device according to the second aspect of the invention can be operated according to the same principles as disclosed for the fixing device according to the first aspect of the invention. Thus, the fixing device can be used to fasten and secure floorplates to steel beams working solely from the top side of the floor plate, without requiring any access to the underneath. However, as provided by the present invention, the fixing device is self-adjusting for different thicknesses of flange, by provision of the steps along the periphery of the base portion of the fixing device.

As the fixing device swings around, upon the initial tightening action of the threaded fastener, one of the step edges comes up against the flange edge, and prevents further rotation of the fixing device. Further tightening of the threaded fastener then draws the flange engaging surface of the adjacent step (below the step whose edge is engaging the flange edge) into engagement with the underside of the flange whereby the flange is clamped firmly between the step and the plate, in order to hold-down the plate on the flange.

Two embodiments of fixing device according to the present invention will now be described in detail, by way of example only, with reference to the accompanying drawings, in which.

Referring now to FIGS. 1 to 6 of the drawings, there is shown a fixing device, designated generally by reference numeral 10, for mounting a plate on one side of a flange of a beam, usually the upper side of the flange. The device 10 comprises a base portion 11 which is slidably engageable with the underside of the flange, an upstanding portion 12 provided on the base portion 11, and a hole 13 extending through base portion 11 and upstanding portion 12. The hole 13 is provided with a screw thread along at least part of its length. Preferably, the hole 13 is a plane drilled hole in the upstanding portion 12, and a tapped hole in the base portion 11.

Figure 1:
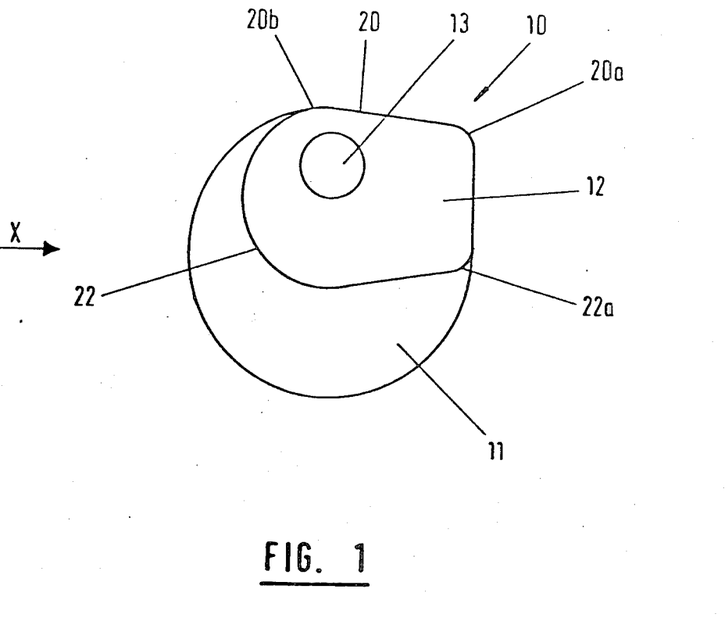
FIG. 1 is a plan view of a first embodiment of fixing device.
Figure 2:
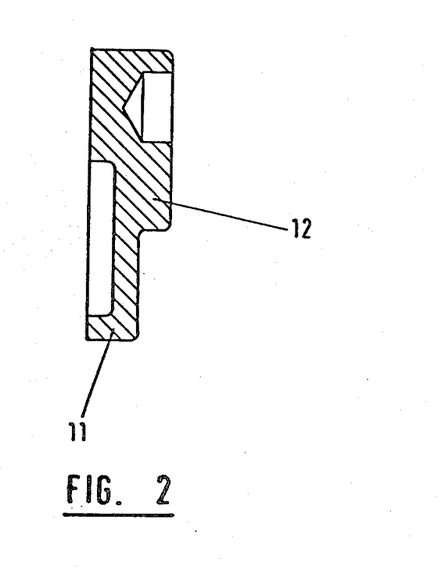
FIG. 2 is a sectional view of the device shown in FIG. 1.
Figure 3:
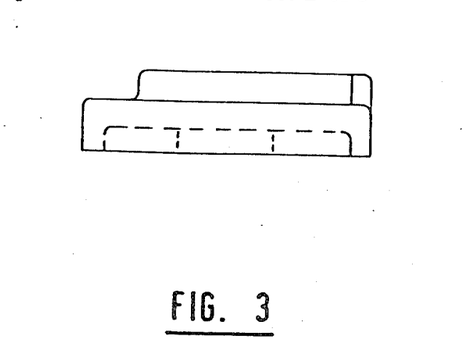
FIG. 3 is a view from one side of the device.
Figure 4:
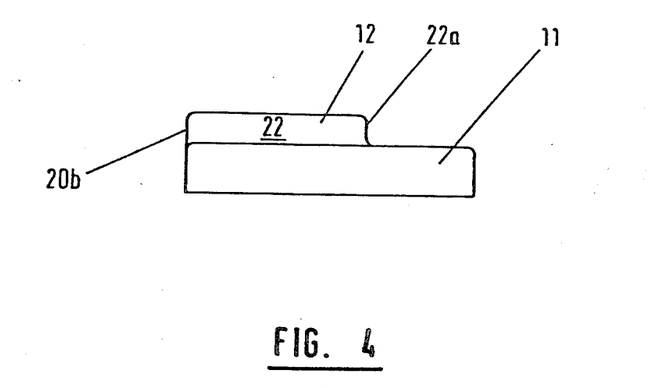
FIG. 4 is an end view of the device taken in the direction of the arrow X in FIG. 1.
Figure 5:
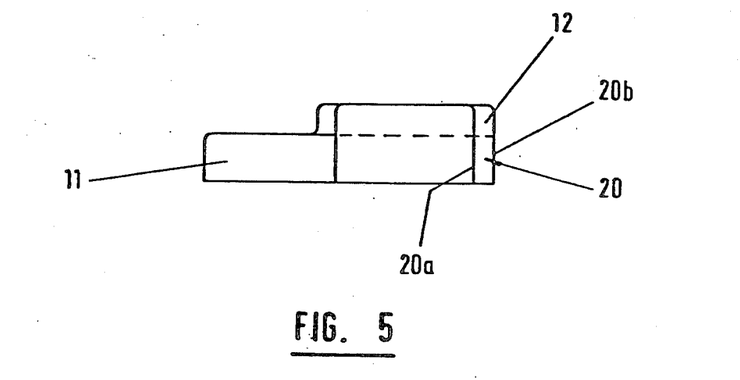
FIG. 5 is a view of an opposite end of the device.
Figure 6:
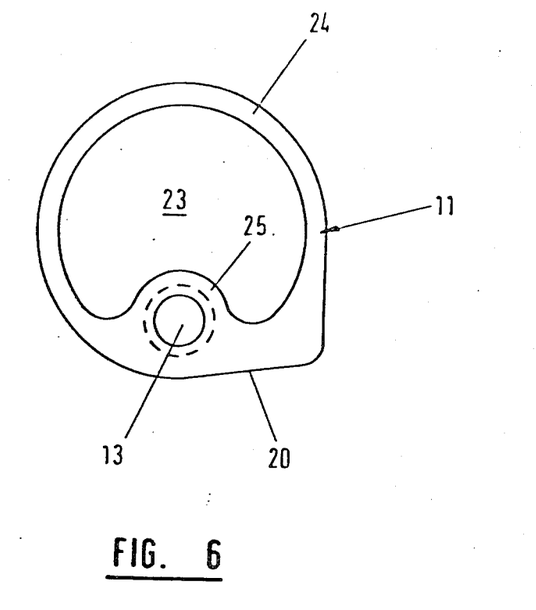
FIG. 6 is an underplan view of the device.

As will be seen particularly in FIGS. 1 and 6, the base portion 11 extends eccentrically with respect to the hole 13 in the device, and this enables the base portion 11 to be pivoted about the axis of the hole 13 between a release position (with respect to the flange which it is to engage) and an engaged position with the flange.

Figure 7:
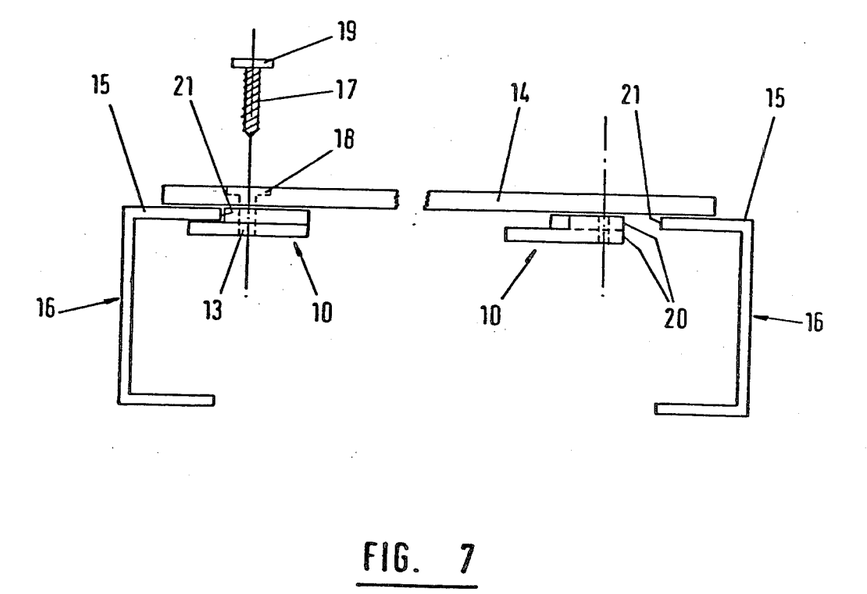
FIG. 7 is an illustration of the fixing device in an engaged mode, and in a release mode, with repect to a plate which it serves to mount on the flanges of two spaced beams.

Referring now to FIG. 7, the fixing device 10 is shown being used to mount a plate 14 on the flanges 15 of two spaced-apart channel beams 16. In the right-hand part of FIG. 7, the fixing device 10 is shown occupying a release mode, whereas the lefthand part of FIG. 7 shows the fixing device 10 in an engaged position with flange 15.

The fixing device is completed by provision of a threaded fastener which may take any convenient form and, as illustrated, comprises an Allen bolt 17. A drilled hole 18 is formed in the plate 14 to accommodate the head 19 of the bolt 17, and the bolt is taken through the plate 14 into threaded engagement with the hole 13 in the device 10.

As will be described in more detail below, the hole 13 forms a pivot axis for the device 10 when the bolt 17 is in engagement therewith whereby the device 10 is pivotable by the bolt between a release position (as shown in the righthand part of FIG. 7) in which the base portion 11 is out of engagement with the underside of the flange 15 and a position of engagement with the underside of the flange. Upon tightening of the bolt 17, when the base portion 11 is in the engaged position, the flange is gripped between the plate 14 and the base portion 11 and the plate 14 is held down onto the upper side of the flange.

FIG. 7 is a diagrammatic illustration, in end view, of a sub-floor composed of chequer or durbar plates forming a sub-floor mounted on flanged support beams positioned on an existing floor (not shown). However, it should be understood that the device according to the invention may be used in other environments in the construction industry in order to mount plates on flanged beams in simple manner. The entire mounting operations can be carried out solely from the "plate" side of the assembly, without the necessity for any holes to be formed in the flanges which support the plates. Furthermore, the plates can readily be removed as and when desired.

Referring again to FIGS. 1 and 6, the fixing device 10 has a rectilinear portion 20 which comprises adjoining end faces of the base portion 11 and the upstanding portion 12 which is intended to be located substantially parallel to the longitudinal edge of the adjacent flange. The fixing device may be provided with some form of "coding" to indicate to an assembler where the rectilinear portion 20 should be located when the device is first attached to the plate. Also, the upstanding portion 12 has a cam or guiding surface which is engageable with the longitudinal edge 21 (see FIG. 7) of flange 15, for a purpose which will be described in more detail below. The rectilinear portion 20 of the fixing device 10, which is provided by the portions 11 and 12, runs from an edge 20a of the device to an edge 20b. The cam or guiding surface, however, is only provided on the upstanding portion 12, designated by reference 22, and runs from edge 20b to an edge 22a.

To mount plate 14 on the flanges 15, the plate 14 will either be pre-drilled with holes for the bolts 17, or will have holes drilled in situ along the edges of the plate. A respective fixing device 10 will be attached fairly tightly at each of the holes by means of an Allen bolt 17, and the fixing device will be manipulated so that its rectilinear portion 20 runs generally parallel to longitudinal edge 21 of the flange, so as to adopt the release position as shown in the righthand part of FIG. 7. When all the fixing devices have been attached, the plate 14 is lowered into position on the flanges 15, and any necessary lateral adjustment can readily be carried out by virtue of the lateral spacing which will be allowed between the rectilinear portion 20 and the flange edges 21. The mounting operation is then carried out by rotating each bolt 17 in a loosening direction through about 360°. The movement of the bolt 17 will be followed by the device 10 until such time as the rectilinear portion 20 comes into abutment with the longitudinal edge 21. This abutment will usually take place between the edge 20a of the rectilinear portion 20 and the edge 21. Continued loosening rotation of the bolt 17 will then cause the fixing device 10 to be only loosely attached in position. Although the fixing device 10 engages the flange edge 21 via edge 20a, this is still a release position of the fixing device.

In order to move the eccentric base portion 11 into sliding engagement with the underside of the flange 15, the bolt 17 is now rotated through about 270° in the normal bolt tightening direction. The fixing device 10 is therefore also rotated in this direction, even although it is only loosely attached to the bolt 17, and the eccentric base portion 11 moves into sliding engagement below the under surface of the flange 15. The base portion 11 continues this movement until such time as the guiding portion 22 comes into engagement with the flange edge 21. When hard contact occurs with the flange edge 21, further rotation of the fixing device 10 is stopped, and continued rotation of the bolt 17 then draws the base portion 11 and plate 14 towards each other in order to embrace the flange 15 tightly therebetween.

When the guiding surface 22 first comes into engagement with flange edge 21, it is able to carry out any necessary minor lateral adjustment of the position of the plate 14 before hard contact is obtained. It will be noted from FIG. 1 that the radial spacing of the guiding surface 22 from the centre of the hole 13 increases progressively with respect to the direction of rotation to the engaged position, so that the guiding surface 22 is able to operate satisfactorily for a range of initial spacings between the axis of the drilled hole in the plate 14 and the flange edge 21.

The fixing device 10 is conveniently formed as a malleable iron casting, and the base portion 11 may have a hollowed out part 23 in its underside i.e. in its side remote from the upstanding portion 12. The hollowed part 23 is defined by a generally annular rim 24 of the base portion 11, and the rim portion 24 has an inward enlargement 25 within which the tapped portion of hole 13 is located.

As will be seen in FIG. 7, the flange 15 is located between the base portion 11 and the plate 14, and space for the flange 15 is provided by means of the upstanding portion 12. To provide firm gripping of the flange 15, in the event of there being an excessive difference between the thickness of the flange and of the upstanding portion, spacers or washers may be introduced.

Referring now to FIGS. 8 to 14, there is shown an improvement in, or modification of the fixing device illustrated in FIGS. 1 to 7. The mode of operation of the modified fixing device is generally similar, and will not be described in detail again. The modified fixing device is designated generally by reference numeral 100 and comprises a base portion 101 and an upstanding portion 102 which projects upwardly, and downwardly of the base portion 101. The portion 102 is formed with a hole 103, at least a part of which is screwthreaded, and is employed for the same purpose as the hole 13 in the fixing device of FIGS. 1 to 7.

Figure 8:
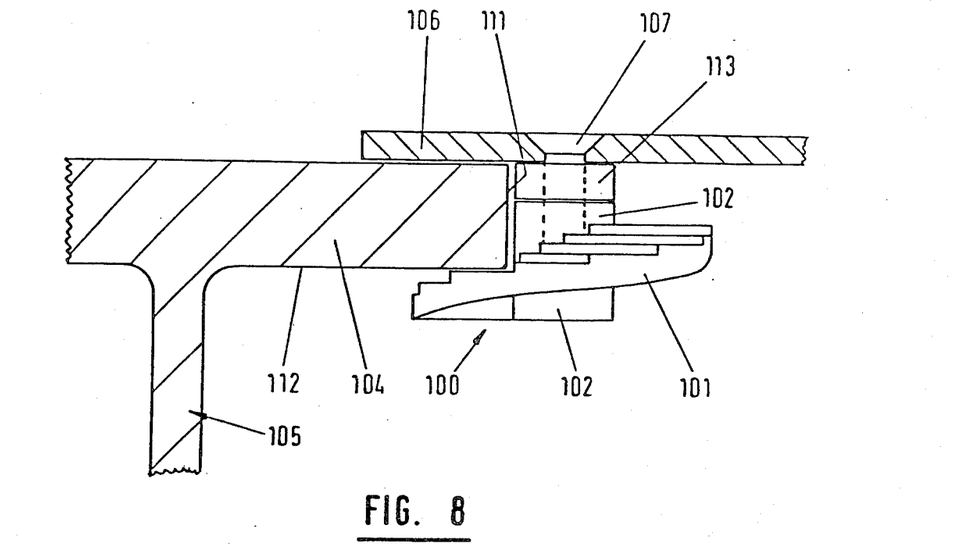
FIG. 8 is a detailed illustration of a second, modified embodiment of fixing device according to the present invention, in an engaged mode with the underside of a flange in order to hold-down a plate on the flange.

The fixing device 100 is shown in FIG. 8 in a position of engagement with the underside of a flange 104 of a beam 105, the fixing device serving to hold-down a floor plate 106 on the flange 104. A threaded fastener 107 is taken through a hole in the floor plate 106 and into threaded engagement with hole 103, and tightening of fastener 107 draws the base portion 101 upwardly into clamping engagement with the flange 104, which is securely held between the base portion 101 and the plate 106.

As will be apparent particularly from FIGS. 9 to 13, the base portion 101 of the fixing device 100 has a series of steps 108 arranged along the periphery of the base portion and partly around the upstanding portion 102, somewhat in the manner of a spiral staircase. Each of the steps 108 is generally triangular in shape, diverging in a direction outwardly of the base portion. However, as will be evident from FIG. 9, the steps 108 do not diverge from the centre of the hole 103, but extend tangentially at 30° spacings from the outer periphery of the portion 102. Further, each step 108 has a curved edge 109, for a purpose which will be described in more detail below.

Figure 9:
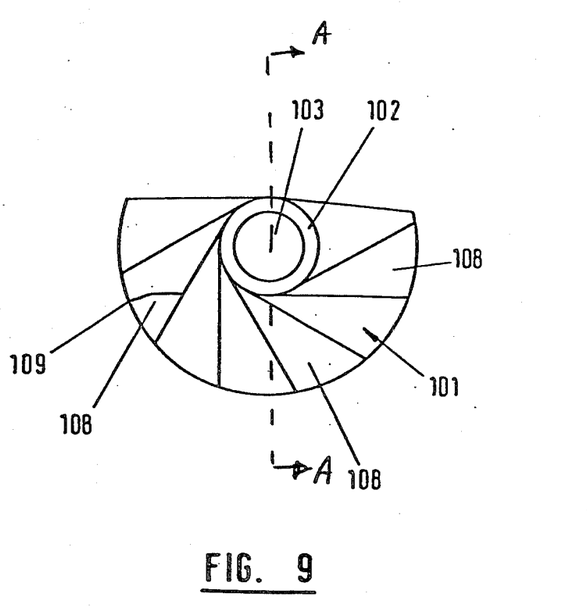
FIG. 9 is a plan view of the modified fixing device.
Figure 10:
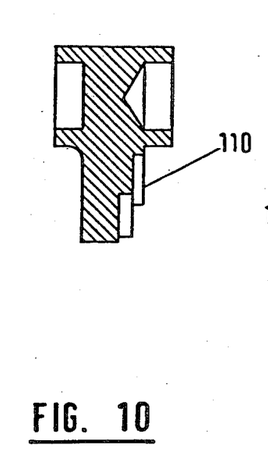
FIG. 10 is a section taken on the line A—A in FIG. 9.
Figure 11:
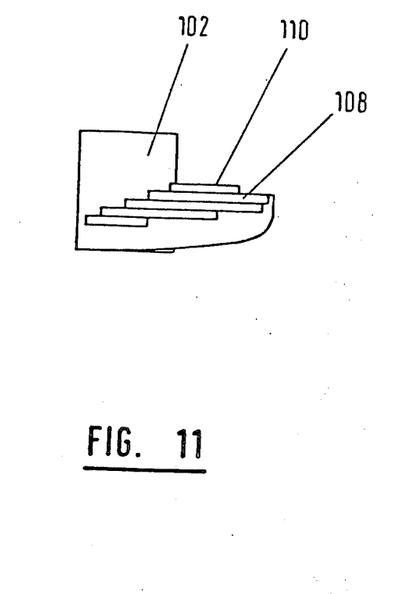
FIG. 11 is a view from one end of the modified fixing device.
Figure 12:
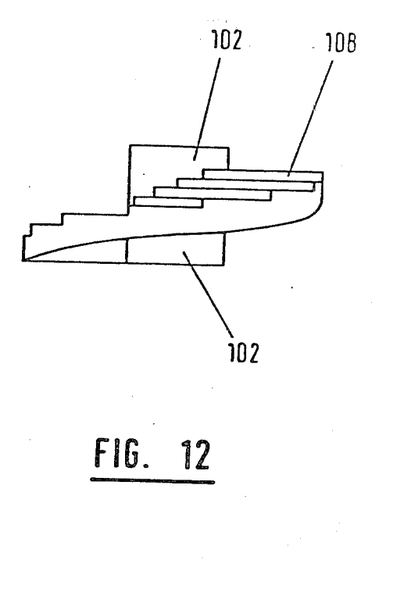
FIG. 12 is a view from one side of the modified fixing device.
Figure 13:
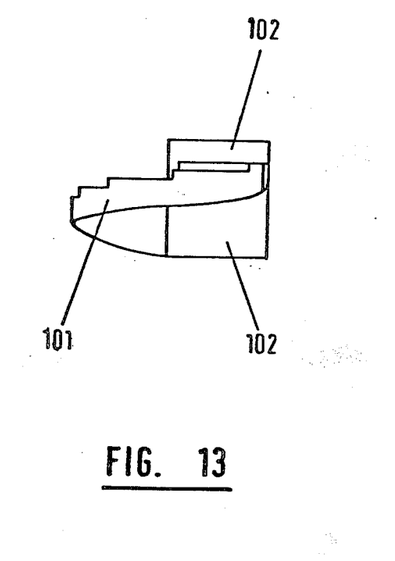
FIG. 13 is a view of an opposite end of the modified fixing device.
Figure 14:
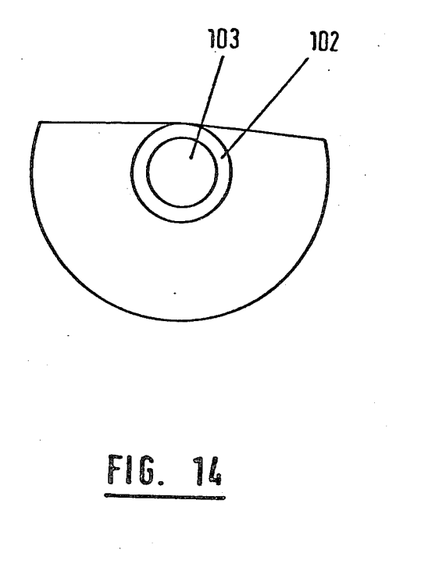
FIG. 14 is an underplan view of the modified fixing device.

Each step 108 has a flange-engaging surface portion 110, which is capable of engaging with the underside of flange 104. In addition, the riser 109 between each step 108 is capable of engaging with the longitudinal edge 111 of flange 104.

The arrangement of the steps 108 of the base portion 101 is such that, upon pivotting of the base portion 101 by the fastener 107 towards the engaged position of the fixing device, the surface portion 110 of one of the steps 108 moves into sliding engagement with the underside 112 of flange 104, and simultaneously the edge 109 of the adjacent step 108 (in the direction towards the plate 106) moves into engagement with the edge 111 of flange 104.

The particular ones of the steps 108 which engage with the flange edge 111 and flange side 112 will depend upon the particular thickness of flange 104. Thus, the modified fixing device is self-adjusting, to suit any particular flange in a range of flange thicknesses, in that the step 108 having its flange-engaging surface 110 at the same spacing from plate 106, corresponding with the thickness of flange 104, will engage with the underside 112 of the flange 104. Simultaneously, the next highest and adjacent step 108 will engage, via its riser 109, with the flange edge 111.

The "risers" between adjacent steps 108 may be set to any desired increment in flange thickness, and in the illustrated embodiment each step provides an increment of 2 mm, so that flanges in the range of thickness between 6 mm and 18 mm can be securely clamped, by a single fixing device, between the base portion 101 of the fixing device and the underside of plate 106.

The geometry of the steps 108 will be arranged such that, in relation to the pivot axis for the device provided by the hole 103, when one step 108 is engaging flange edge 111 via its riser 109, the immediately adjacent, and lower step 108 will be in a position to engage the underside 112 of flange 104 via a narrow arcuate clamping portion of the surface 110 of step 108 which is adjacent to the riser 109 of the lower step.

In order to enable a single design of modified fixing device 100 to be used with flanges in an additional range of sizes, a collar 113 (see FIG. 8) may be provided, which fits between the underside of plate 106 and the upper surface of upstanding portion 102. If, for example, the collar has a thickness of 10 mm, and the fixing device 100 is normally designed to be used with flanges in a range of thicknesses from 6 mm to 18 mm, then the combined assembly can be used with flanges having thicknesses in the range 16 mm to 28 mm.

We claim:

1. A fixing device for mounting a plate on one side of a flange of a beam, said device comprising a base portion for engagement with an opposite side of the flange, an upstanding portion provided on said base portion, a hole formed in said upstanding portion and having a screwthread along at least part of its length, and a threaded fastener adapted to be taken through a hole in the plate and into threaded engagement with the hole in the upstanding portion in order to hold-down the plate onto the flange, in which:

the hole forms a pivot axis for the device when the threaded fastener is in engagement therewith, whereby the device is pivotable by the threaded fastener between a release position in which the base portion is out of engagement with said opposite side of the flange and a position of engagement with said opposite side of the flange so that, upon lightening of the fastener, the flange is gripped between the plate and the base portion of the fixing device and the plate is thereby held-down onto the flange;

and the base portion comprises two or more steps arranged along at least part of the periphery of the base portion, each step having a flange-engaging surface portion for engaging said opposite side of the flange and an edge portion for engaging the edge of the flange, and the arrangement being such that, upon pivotting of the base portion by the fastener to the engage position, the flange-engaging surface portion of one of the steps moves into sliding engagement with said opposite side of the flange and the edge portion of the adjacent step (in the direction towards the plate) moves into engagement with the edge of the flange.

2. A fixing device according to claim 1, including a continuous series of steps arranged along the periphery of the base portion, so as to render the fixing device self-adjusting to suit a range of flange thicknesses.

3. A fixing device according to claim 2, in which the steps are arranged partly around the upstanding portion in the manner of a spiral staircase.

4. A fixing device according to claim 1, including a detachable collar which is co-operable with the upstanding portion to increase the range of flange thickness with which the device is to be used.

* * * * *